US010820038B2

(12) United States Patent
Friedman (10) Patent No.: US 10,820,038 B2
(45) Date of Patent: *Oct. 27, 2020

(54) METHOD AND APPARATUS FOR AUGMENTING MEDIA SERVICES

(71) Applicant: AT&T Intellectual Property I, L.P., Atlanta, GA (US)

(72) Inventor: Lee Friedman, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,439

(22) Filed: Oct. 17, 2018

(65) Prior Publication Data

US 2019/0052924 A1 Feb. 14, 2019

Related U.S. Application Data

(63) Continuation of application No. 15/450,489, filed on Mar. 6, 2017, now Pat. No. 10,136,177, which is a
(Continued)

(51) Int. Cl.
*H04N 21/431* (2011.01)
*G06T 7/70* (2017.01)
(Continued)

(52) U.S. Cl.
CPC ....... *H04N 21/4316* (2013.01); *G06F 3/0346* (2013.01); *G06K 7/10722* (2013.01);
(Continued)

(58) Field of Classification Search
CPC ........... H04N 21/4316; H04N 5/44582; H04N 5/44591; H04N 21/23418; H04N 21/23424; H04N 21/4122; H04N 21/4126; H04N 21/4223; H04N 21/435; H04N 21/4722; H04N 21/812; G06T 7/70; G06T 3/20; G06T 7/20; G06F 3/0346; G06K 7/10722
See application file for complete search history.

(56) References Cited

U.S. PATENT DOCUMENTS

6,411,725 B1 6/2002 Rhoads
7,421,376 B1 9/2008 Caruso et al.
(Continued)

*Primary Examiner* — John R Schnurr
(74) *Attorney, Agent, or Firm* — Guntin & Gust, PLC; Jay H. Anderson (57) ABSTRACT

A system that incorporates teachings of the present disclosure may include, for example, a media processor that includes a memory and a controller coupled to the memory. The controller can be programmed to receive media content from a set top box where the set top box is a separate device from the media processor and where the media content includes video content. The controller can also be programmed to receive supplemental content from a mobile communication device where the supplemental content is based on reading of a two dimensional bar code by the mobile communication device, and where the supplemental content comprises an image. The controller can further be programmed to generate augmented content by overlaying the supplemental content with the media content and to provide the augmented content to a display device for presentation.

20 Claims, 8 Drawing Sheets

Related U.S. Application Data continuation of application No. 15/064,109, filed on Mar. 8, 2016, now Pat. No. 9,628,848, which is a continuation of application No. 14/133,805, filed on Dec. 19, 2013, now Pat. No. 9,313,543, which is a continuation of application No. 13/106,028, filed on May 12, 2011, now Pat. No. 8,621,548.

(51) Int. Cl.

| | | |
|---|---|---|
| *H04N 21/41* | (2011.01) | |
| *H04N 21/4722* | (2011.01) | |
| *H04N 21/47* | (2011.01) | |
| *H04N 21/422* | (2011.01) | |
| *H04N 21/435* | (2011.01) | |
| *G06F 3/0346* | (2013.01) | |
| *G06K 7/10* | (2006.01) | |
| *G06T 3/20* | (2006.01) | |
| *G06T 7/20* | (2017.01) | |
| *H04N 21/234* | (2011.01) | |
| *H04N 21/4223* | (2011.01) | |
| *H04N 21/81* | (2011.01) | |

(52) U.S. Cl.
CPC ............... *G06T 3/20* (2013.01); *G06T 7/20* (2013.01); *G06T 7/70* (2017.01); *H04N 21/23418* (2013.01); *H04N 21/23424* (2013.01); *H04N 21/4122* (2013.01); *H04N 21/4126* (2013.01); *H04N 21/4223* (2013.01); *H04N 21/42204* (2013.01); *H04N 21/435* (2013.01); *H04N 21/47* (2013.01); *H04N 21/4722* (2013.01); *H04N 21/812* (2013.01)

(56) References Cited

U.S. PATENT DOCUMENTS

| | | |
|---|---|---|
| 7,516,074 B2 | 4/2009 | Bilobrov |
| 7,979,877 B2 * | 7/2011 | Huber et al. |
| 9,407,973 B2 * | 8/2016 | Pratt ................... H04N 21/4722 |
| 10,070,201 B2 * | 9/2018 | Avison-Fell ....... H04N 21/8586 |
| 2002/0162118 A1 | 10/2002 | Levy |
| 2004/0211836 A1 | 10/2004 | Patel et al. |
| 2005/0018216 A1 | 1/2005 | Barsness et al. |
| 2005/0210526 A1 | 9/2005 | Levy et al. |
| 2008/0092201 A1 | 4/2008 | Agarwal et al. |
| 2009/0031373 A1 | 1/2009 | Hogyoku |
| 2009/0113475 A1 * | 4/2009 | Li ....................... G06F 16/7867 725/39 |
| 2010/0118115 A1 | 5/2010 | Takahashi et al. |
| 2010/0129055 A1 | 5/2010 | Lorphelin |
| 2010/0131847 A1 | 5/2010 | Sievert et al. |
| 2011/0043652 A1 | 2/2011 | King |
| 2011/0099069 A1 | 4/2011 | Hoelz et al. |
| 2012/0017236 A1 * | 1/2012 | Stafford ................... A63F 13/00 725/32 |
| 2012/0210349 A1 | 8/2012 | Campana et al. |
| 2016/0191978 A1 | 6/2016 | Friedman |
| 2017/0180783 A1 | 6/2017 | Friedman |

\* cited by examiner

METHOD AND APPARATUS FOR AUGMENTING MEDIA SERVICES

CROSS-REFERENCE TO RELATED APPLICATIONS

This application is a continuation of U.S. patent application Ser. No. 15/450,489 filed Mar. 6, 2017, which is a continuation of U.S. patent application Ser. No. 15/064,109 filed Mar. 8, 2016, which is a continuation of U.S. patent application Ser. No. 14/133,805 filed Dec. 19, 2013 (now U.S. Pat. No. 9,313,543), which is a continuation of U.S. patent application Ser. No. 13/106,028 filed May 12, 2011 (now U.S. Pat. No. 8,621,548). The contents of each of the foregoing are hereby incorporated by reference into this application as if set forth herein in full.

FIELD OF THE DISCLOSURE

The present disclosure relates generally to media services and more specifically to a method and apparatus for augmenting media services.

BACKGROUND

With the wide availability and variety of services, it is common for consumers to utilize a single service provider to provide voice, video and data communication services. This allows the single service provider to exert control over the services being provided, including types of media content and advertising. Consumers often desire more choices in the services that are available to them.

DETAILED DESCRIPTION

The present disclosure describes, among other things, illustrative embodiments for augmenting media services by providing supplemental content to be overlayed or otherwise combined with media services being delivered to a display device, such as through a set top box. In one embodiment, a media processor can be coupled with a set top box for receiving media services from a first service provider and augmenting the media services with supplemental services that can be received at the media processor from a source other than the set top box, such as from a media server of a second service provider. The media processor can receive media content from a mobile communication device via the gateway and can combine media content from various sources. The supplemental content can be obtained based on an analysis of the media content, including identification of objects depicted in the media content.

In one embodiment, the media content or other data can be provided to the media processor based on reading of a two dimensional bar code. The type of data can vary and can include twitter messages, audio and/or video content, still images, text and so forth. Orientation and/or movement of a device performing the reading can be used by the media processor to control orientation and/or movement of a display of the supplemental content on the display device. In one embodiment, the bar code can provide commands to the media processor. In another embodiment, the bar code can be a URL, text, and/or initiate an application launch at the media processor.

One embodiment of the present disclosure includes a media processor having a memory and a controller coupled to the memory. The controller is programmed to receive media content from a set top box where the set top box is a separate device from the media processor and where the media content comprises video content, and to receive supplemental content from a mobile communication device, where the supplemental content is based on reading of a two dimensional bar code by the mobile communication device, and where the supplemental content comprises an image. The controller is also programmed to generate augmented content by overlaying the supplemental content with the media content and to provide the augmented content to a display device for presentation.

One embodiment of the present disclosure is a method including receiving media content at a media processor where the media content is received from a set top box and where the set top box is a separate device from the media processor, receiving supplemental content at the media processor where the supplemental content is received from a communication device, and generating augmented content by overlaying the supplemental content with the media content. The method can include receiving orientation signals at the media processor where the orientation signals are received from the communication device and where the orientation signals are based on a first orientation of the communication device, and adjusting a second orientation of the supplemental content in the augmented content based on the orientation signals.

One embodiment of the present disclosure includes a non-transitory computer-readable storage medium. The medium includes computer instructions to receive media content at a media processor, where the media content is received from a set top box, where the set top box is a separate device coupled with the media processor over a hardwire link, where the media content is received at the set top box via a gateway from a first service provider, and where the media content comprises video content. The computer instructions also monitor the media content using the media processor, generate a request for supplemental content at the media processor where the request is based on the monitoring of the media content, and transmit the request via the gateway to a media server of a second service provider. The computer instructions also receive supplemental content at the media processor where the supplemental content is received via the gateway from the media server of the second service provider and where the supplemental content comprises at least one image. The computer instructions further generate augmented content by overlaying the supplemental content with the media content, and provide the augmented content to a display device for presentation. The generating of the augmented content can comprise muxing of video graphics from the media and supplemental content, where the muxing is performed based on a request of a user of the media processor.

Figure 1:
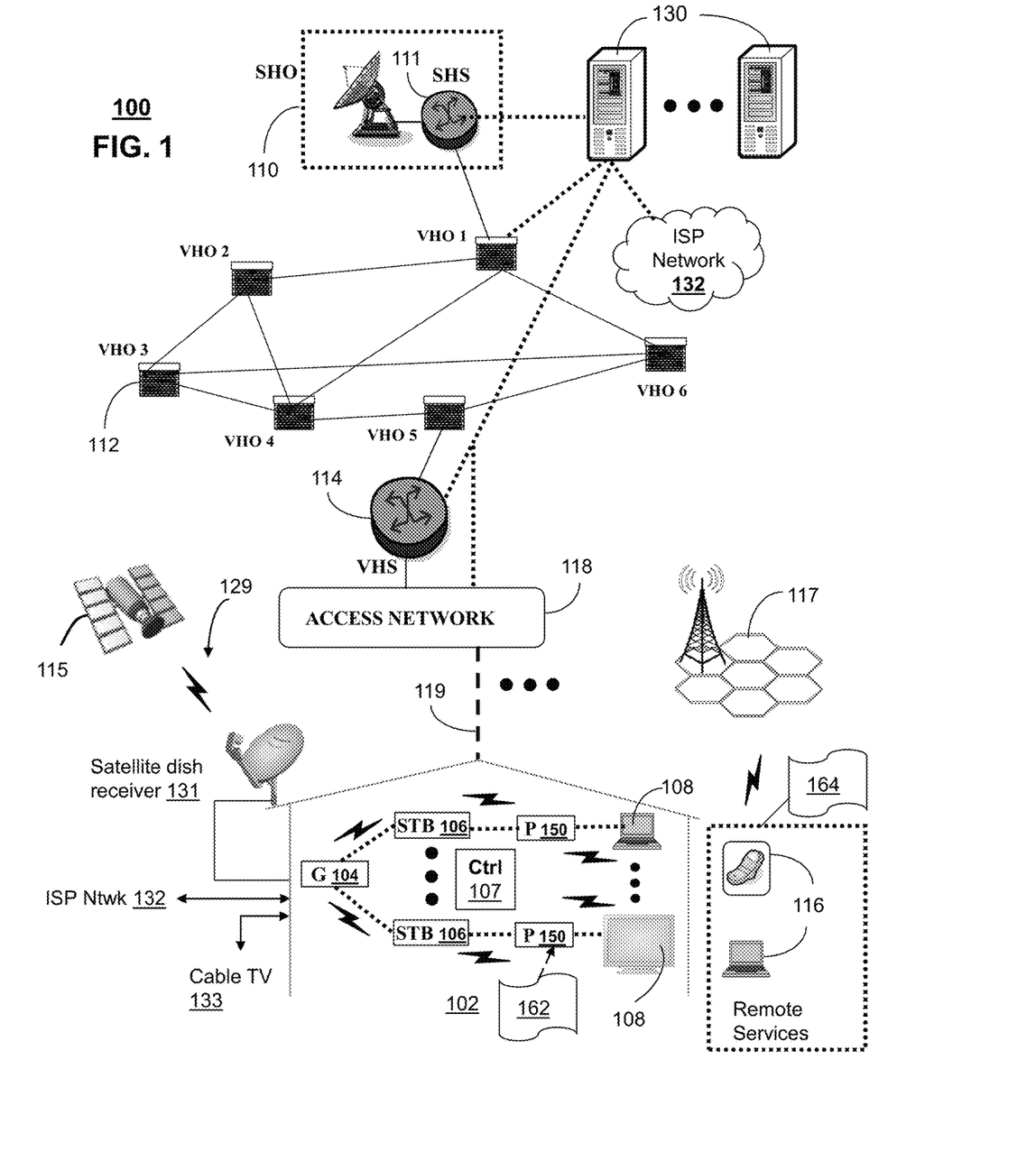
FIG. 1 depicts an illustrative embodiment of a communication system that provides media services.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provides broadband services over fiber optical links or copper twisted pairs 119 to buildings 102. The gateway 104 can use common communication technology to distribute broadcast signals to Set-Top Boxes (STBs) 106, which in turn present broadcast channels to media devices 108 such as computers or television sets managed in some instances by a media controller 107 (such as an infrared or RF remote control).

The gateway 104, the STBs 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the STBs 106 and subsystems of the IPTV media system for services such as video-on-demand (VoD), browsing an electronic programming guide (EPG), or other infrastructure services. One or more of the exemplary embodiments contemplate the media devices 108 being mobile device, including tablets (e.g., a WiFi tablet), smartphones, and so forth.

A satellite broadcast television system 129 can also be used in the media system of FIG. 1. The satellite broadcast television system 129 can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the STBs 106 for demodulating, decoding, encoding, and/or distributing broadcast channels to the media devices 108. The STBs 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services. It is contemplated that the present disclosure can apply to any present or next generation over-the-air and/or landline media content services system. Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so forth. Other present and next generation wide area wireless network technologies are contemplated by the present disclosure. System 100 can include a media processor 150 coupled to the STB 106 and the display device 108, such as through a hardwire link, although the present disclosure also contemplates use of a wireless connection. The media processor 150 can receive media services from the STB 106, such as video content that is intended to be displayed on the display device 108. The media processor 150 can receive supplemental services, such as still images, video content, data and so forth from a source other than the STB 106. In one embodiment, the supplemental content can be received by the media processor 150 from the gateway 104, such as via a wireless connection with the gateway 104. The media processor 150 allows for simultaneous receipt of all or a portion of media services from a plurality of sources, which can include the STB 106, a media server via the gateway 104, and/or a mobile device 116 (e.g., via the gateway 104). The media processor 150 can overlay content that is currently being received and/or overlay recorded content, including content stored at the media processor 150 and/or stored at another device for presentation at the display device 108 (e.g., a TV). The media processor 150 can include a number of different components, such as an input/output for HD, SD and/or 3D content. The media processor 150 can also include a video/graphics multiplexer that acts as a video graphics proxy to mix or otherwise combine multiple data (including multiple data types) from multiple sources.

The media processor 150 can combine the media services and the supplemental services for presentation at the display device 108. For example, the media processor 150 can overlay the supplemental services on the media services. The overlay can be generated based on a number of factors, including user preferences, user profiles, viewing history, type of media content being presented and so forth.

The media processor 150 can obtain the supplemental content in a number of different ways. In one embodiment, the supplemental content can be obtained based on an analysis of the media content being provided by the STB 106. For example, image recognition can be applied to images of the media content to identify particular objects in the media content. Supplemental content can be requested by the media processor 150 via the gateway 104 from a content source, including from a different service provider. The supplemental content can be of various forms, including advertisement or marketing information, related information such as similar movies or actor's biographies, and so forth. In another embodiment, the media processor 150 can determine when a user is requesting particular content, such as ordering a VOD movie via the STB 106 and can provide alternative viewing for the movie, such as from a different source or a different version (e.g., HD version, G-rated version, and so forth). In one example, the media processor 150 can provide alternative sources, including alternate service providers, based on cost differentials, such as where the VOD movie costs more to order via the STB 106 than the same movie available over the Internet.

In another embodiment, the supplemental content can be obtained based on preferences and/or selections of the user. For example, the user can have preferences established, such as through a user profile, which indicate a desire to see actor biographies when a movie is being watched.

In yet another embodiment, the supplemental content can be unrelated to the media content being received from the STB 106. For example, the supplemental content can be weather and/or traffic conditions, local news headlines, and so forth. The supplemental content can also be unrelated to the media services of the STB 106 but related to the particular viewer, such as emails, instant messages and so forth.

In one embodiment, media processor 150 can include storage medium 162 which can have computer instructions for translating orientation and/or movement of a bar code reading device into orientation and/or movement of a display of the supplemental content on the display device 108. For example, a mobile device 116 can include a bar code reader which transmits data acquired from a bar code to the media processor 150, such as wirelessly via the gateway 104. The mobile device 116 can also transmit position data including orientation and/or movement data associated with the mobile device 116 (such as with respect to the position of the bar code), which is then utilized by the media processor 150 to control the presentation of the supplemental content that is being displayed based on the bar code data.

For instance, a user can rotate the mobile device 116 which causes an object generated from two dimensional bar code data to be rotated on the display device 108. In another example, other commands entered at the mobile device 116 can be utilized to manipulate the object being presented at the display device 108, such as in conjunction with the orientation and/or movement data. For instance, the object can be a car being presented at the display device 108. The mobile device 116 can be manipulated (e.g., changing orientation and/or position of the device with respect to the bar code) so as to present a view of the trunk of the car on the display device 108. Another command signal (e.g., depressing a button on the mobile device) can subsequently be received from the mobile device 116 which can cause the trunk, which is being depicted on display device 108, to open.

The bar code reader can be a component of the mobile device 116 that allows for real-time reading and transmission of bar code data, such as through use of computer instructions stored in storage medium 164. In another embodiment, the mobile device 116 can utilize a camera (e.g., integrated with the mobile device 116) to capture an image of the bar code and can analyze the image to acquire the bar code data. In this example, the orientation and/or movement of the mobile device 116 does not need to be with respect to the bar code, but rather can be with respect to some other focal point (including internal). The mobile device 116 can utilize various components and/or techniques to determine the orientation and/or movement data, such as an accelerometer or a gyroscope.

System 100 provides a media processor 150 that can mux video graphics from multiple sources and present the augmented content on demand. The media processor can communicate with an STB 106 of a first service provider, while the media processor is provided via a second service provider, and can receive supplemental content from the second service provider. The media processor 150 also allows for acquiring various information from a two dimensional bar code for presentation at a display device.

Figure 2:
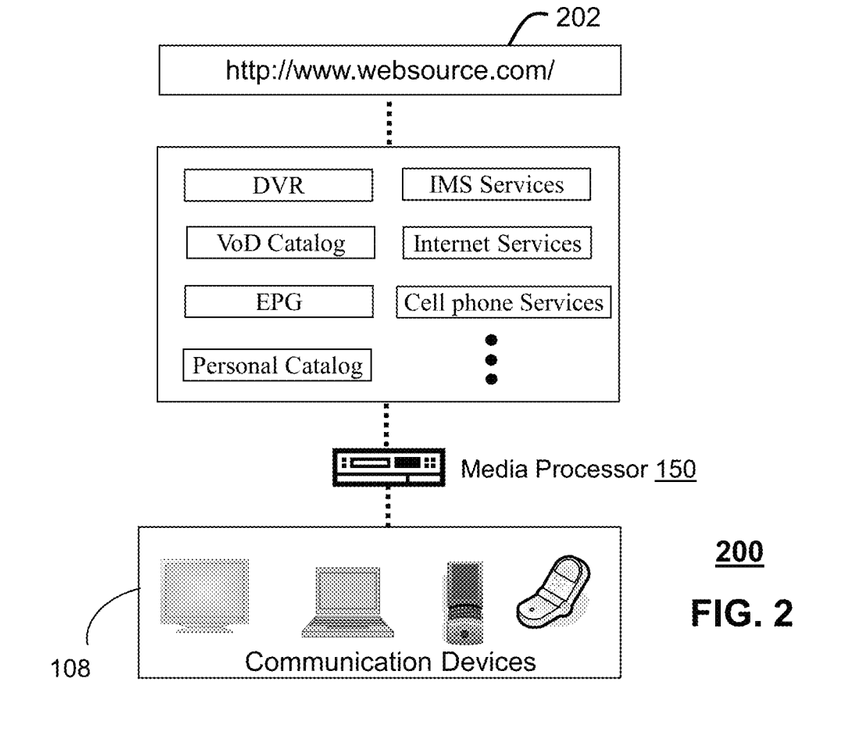
FIG. 2 depicts an illustrative embodiment of a media processor that can source data from a web source for interacting with the communication system of FIG. 1.

FIG. 2 depicts an illustrative embodiment of an Internet or web source 202, which can be used in conjunction with media processor 150. For instance, the web source 202 can be a source of media content accessed by the media processor 150, where one or more applications being executed at the media processor 150 can retrieve content from the web source and can combine the supplemental content received from the web source with content being received from the STB 106. The web source 202 can be hosted by server applications operating from the computing devices 130 of the communication system 100 illustrated in FIG. 1. In one embodiment, the web source 202 can be used for managing other services of communication system 100, while media processor 150 is used for managing the overlay of supplemental content with the media content provided via STB 106. In one embodiment, the media processor 150 can be configured, for example, to access a Digital Video Recorder (DVR), a Video on Demand (VoD) catalog, an Electronic Programming Guide (EPG), or a personal catalog (such as personal videos, pictures, audio recordings, etc.) stored in the STB 106. The web portal 202 can be used for provisioning IMS services described earlier, provisioning Internet services, provisioning cellular phone services, and so on. One or more of the exemplary embodiments contemplate sourcing supplemental content, which can include audio and/or video content, data and so forth, to the media processor 150 from various sources, including more than one service provider. In one embodiment, a cloud computing configuration can be utilized for sourcing a portion of the data to the media processor 150.

Figure 3:
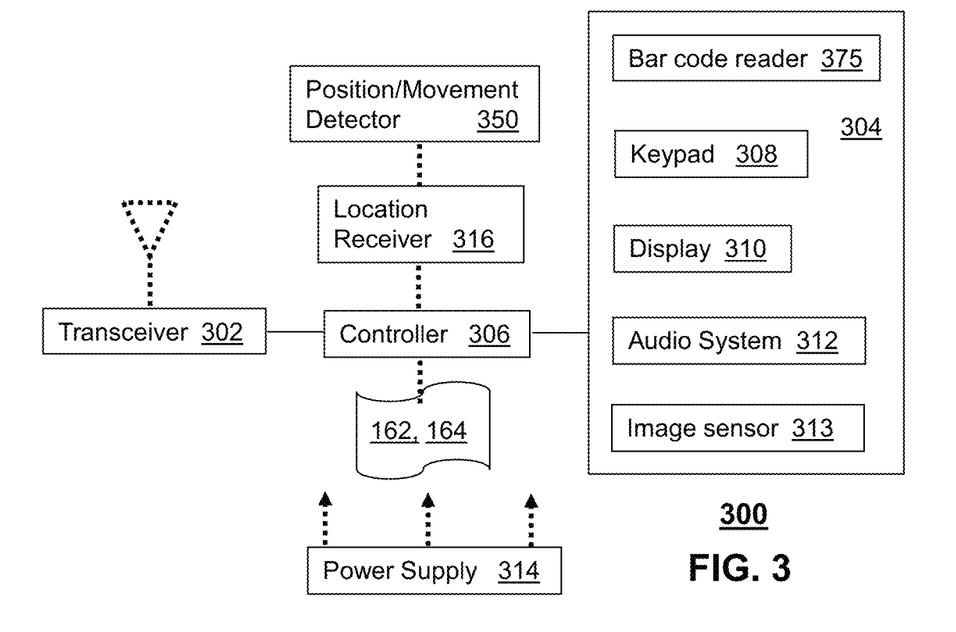
FIG. 3 depicts an illustrative embodiment of a communication device utilized in the communication system of FIG. 1.

FIG. 3 depicts an exemplary embodiment of a communication device 300. Communication device 300 can serve in whole or in part as an illustrative embodiment of the devices depicted in FIG. 1. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation cellular wireless communication technologies as they arise. The transceiver 302 can also be adapted to support circuit-switched wireline access technologies (such as PSTN), packet-switched wireline access technologies (such as TCPIP, VOID, etc.), and combinations thereof.

The UI 304 can include a depressible or touch-sensitive keypad 308 with a navigation mechanism such as a roller ball, a joystick, a mouse, or a navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display 310 with its navigation features.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver capable of assisted GPS for identifying a location of the communication device 300 based on signals generated by a constellation of GPS satellites, thereby facilitating common location services such as navigation.

The communication device 300 can also use the transceiver 302 to determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the STBs 106, the media processor 150, the media devices 108, or the portable communication devices 116 of FIG. 1. It will be appreciated that the communication device 300 can also represent other common devices that can operate in communication system 100 of FIG. 1, such as a gaming console and a media player.

Communication device 300 can include a detector 350 for determining the position and/or movement of the communication device 300. For instance, detector 350 can include one or more components and can apply one or more techniques for determining and generating position data corresponding to an orientation and/or movement of the communication device 300. The position data can be transmitted from the communication device 300 to the media processor 150, such as via the gateway 104. In one embodiment, communication device 300 can include a bar code reader for reading single and/or multi-dimensional bar codes.

It is further contemplated that the communication device 300 can operate as an STB, a portable communication device or a server performing the functions described with respect to storage mediums 162 and 164, as described earlier. Illustrative embodiments of methods that can operate in portions of the communication device 300 of FIG. 3 are described below.

Figure 4:
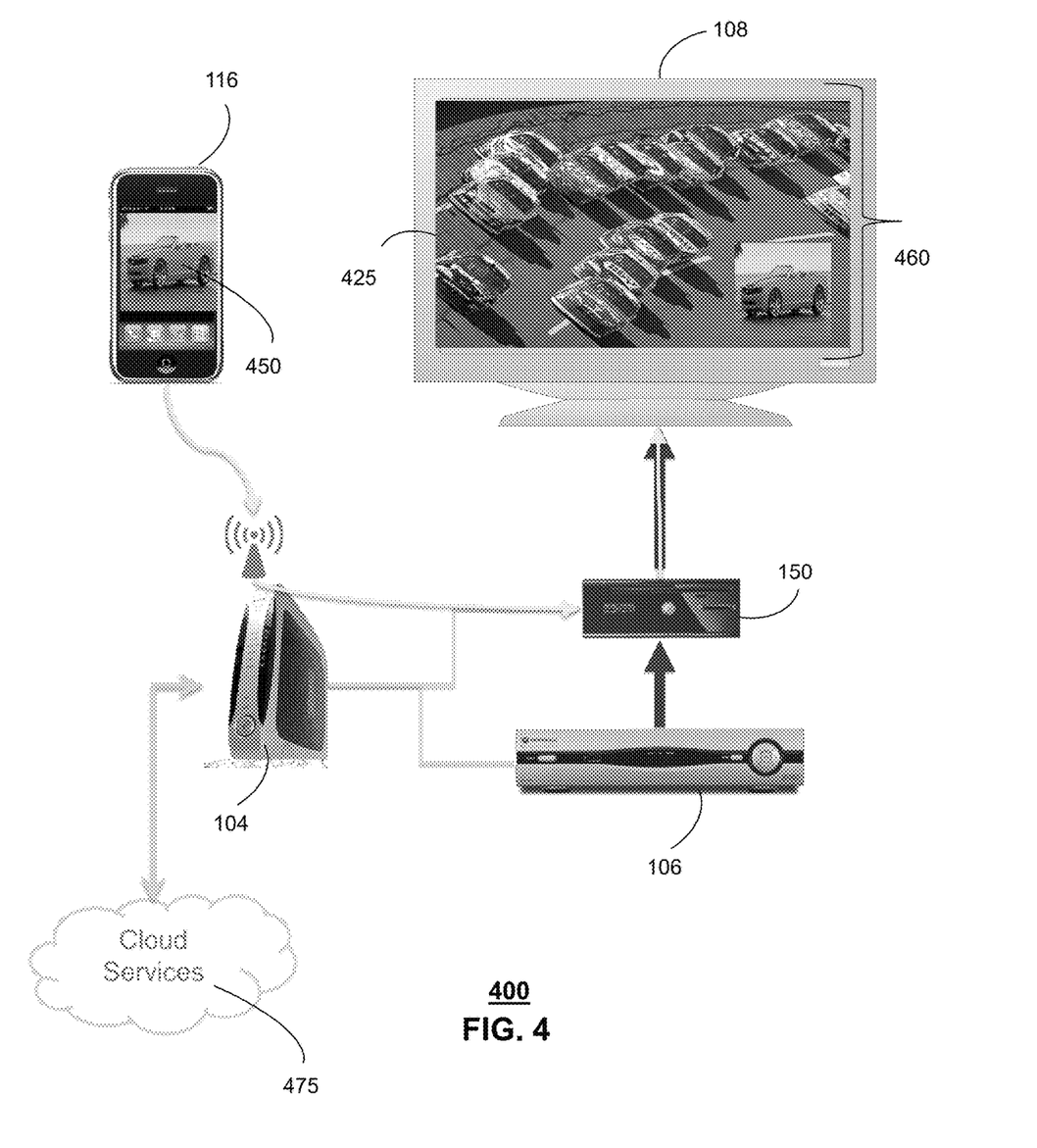
FIGS. 4-5 depict illustrative embodiments of a portion of the system of FIG. 1 providing media services.

FIG. 4 depicts a portion of a communication system 400, such as system 100 of FIG. 1. The media processor 150 can receive media services from the STB 106, such as scheduled programming 425 of an auto race. In this embodiment, the STB 106 can receive the programming 425 from a service provider network via the gateway 104 and can deliver the services to the media processor 150 via a hardwire link. The media processor 150 can receive supplemental content 450, which in this example is an image of an automobile, from another source (e.g., a mobile device 116) via the gateway 104. In this example, the media processor 150 can have a wireless connection with the gateway 104 so that the supplemental content bypasses the STB 106.

The media processor 150 can combine the supplemental content 450 with the programming 425 and deliver augmented content 460 for presentation at the display device 108. The augmented content 460 can be presented in various formats. For example, the supplemental content 450 can be overlayed with the programming 425. In one embodiment, the media processor 150 can determine a display position to overlay the supplemental content 450 in order to reduce interference or blocking of objects in the programming 425. For example, the media processor 150 can determine that the programming 425 is an auto race where the bottom right portion of the display has the least number of objects. Other criteria and techniques can also be used for determining the configuration of the augmented content, such as user preferences, user profiles, types of content, metadata and so forth.

In one embodiment, the mobile device 116 can receive and/or retrieve the supplemental content 450 from a service provider that is different from the service provider associated with the programming 425. The supplemental content 450 can be supplied at the request of a user of the mobile device 116 and/or can be requested by the media processor 150. For example, the media processor 150 can analyze the programming 425 and request supplemental content 450 that is related to the programming 425, such as an advertisement of an automobile of the same brand that is in the lead in the auto race of the programming 425. In this example, the context of the programming 425 can be utilized for requesting the supplemental content 450. The context in this example is the leader of the race of programming 425. However, other context information can also be utilized in the present disclosure, such as an actor singing a song in a movie. In such an example, the supplemental content can be other individuals that have sung the same song or other songs sung by the same actor. The context can be determined by media processor 150 in a number of different ways, including using image recognition to identify objects in video content, metadata describing particular portions of programming, and so forth.

In one embodiment, other sources, such as cloud services 475, can deliver media services to the media processor 150 for presentation at the display device 108. The media processor 150 can overlay media content from any number of different sources, which can include the media services provided by the STB 106. The various media content can be delivered simultaneously and/or at different times (and recorded) in order to be combined into the augmented content 460.

In one embodiment, media processor 150 can provide an embedded platform for adding gesture-based services to existing media services 425, such as through use of the mobile device 116. The mobile device 116 can be utilized to control presentation of the augmented content 460, including through monitoring the orientation and/or movement of the mobile device 116 and translating any changes to the view being presented at the display device 108. In another embodiment, services can be stored at the media processor 150 to enhance access speed.

System 400 allows for providing augmented content through use of one or more applications being executed at the media processor 150. The media processor 150 can retrieve data from a variety of sources, and can include a multiplexer for muxing video graphics for presentation at a television or the like.

Figure 5:
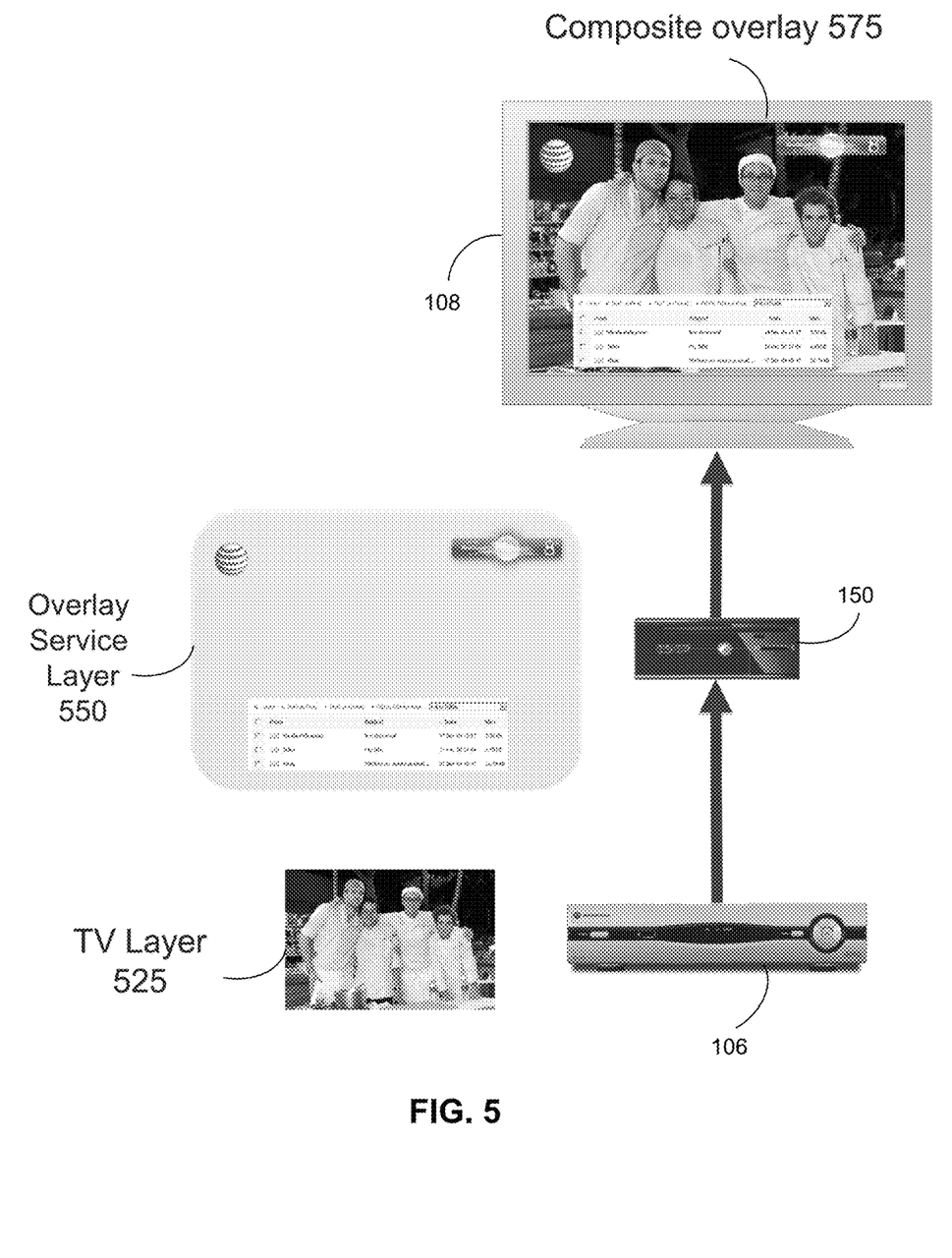

FIG. 5 illustrates one example of a composite overlay 575 that can be generated by the media processor 150 based on a TV layer 525 received from the STB 106 and based on an overlay service layer 550 received from a source other than the STB 106. In this embodiment, the overlay service layer 550 comprises information that is unrelated to the TV layer 525, such as weather information and email information. The information for the overlay service layer 550 can be retrieved from various sources, including wirelessly from a personal computer in the residence. The user can customize the overlay service layer 550 as desired, including the size and positioning of various information. In one embodiment, user preferences and/or user profiles can be utilized for determining how the composite overlay 575 is to be generated, including whether it is only to be generated during particular time frames or types of media content.

Figure 6:
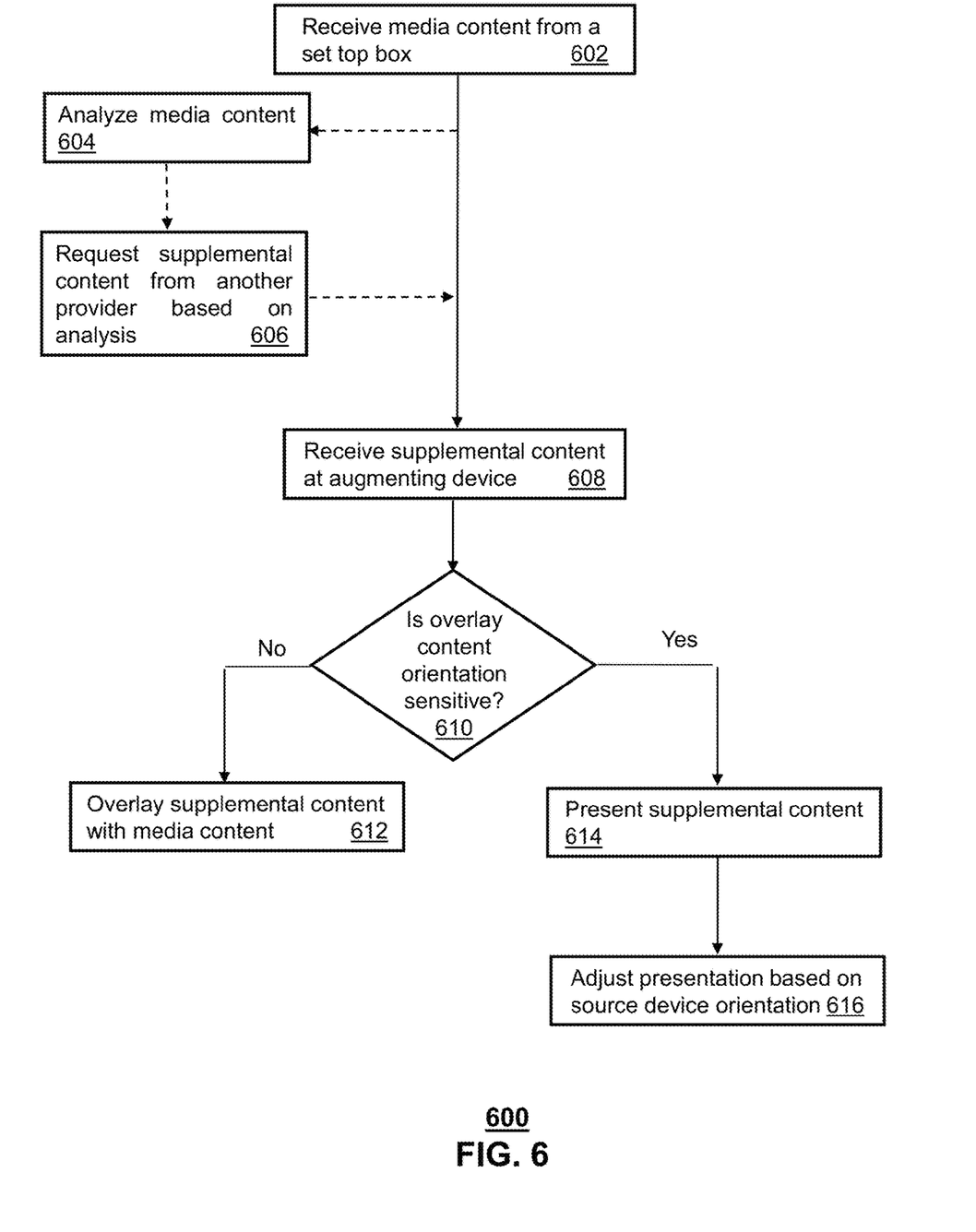
FIG. 6 depicts illustrative embodiments of a method operating in portions of the systems described in FIGS. 1-5.

FIG. 6 depicts an illustrative method 600 that describes operations of one or more devices of FIGS. 1-5. Method 600 illustrates the receipt, muxing and presentation of video graphics and/or other data from multiple sources, which can include an STB. Method 600 also provides for presentation of content at a display device where the presentation is sensitive to changes in the orientation and/or position of the device sourcing the content, such as a smart-phone. Method 600 can begin at 602 in which media services (e.g., video content) are received at the media processor 150 from the STB 106. In one embodiment at 604, the media services, such as content being delivered, can be analyzed. The analysis can be based on a number of techniques including image and/or audio recognition, metadata and so forth. In one embodiment, the analysis can include identifying objects being presented in an image and determining a context for the object. For example, the media processor 150 can apply image recognition to programming of an auto race as shown in FIG. 4. Based on the image recognition, the media processor 150 can identify one of the cars as a particular make and model. The media processor 150 can also determine the context of the image to be the particular car in the lead of an auto race. For example, the contextual analysis can be based on determining a subject matter of the content which is a sporting event and the type of sporting event which is an auto race. The contextual analysis can also determine criteria associated with auto races, such as the winner being the lead car. Based on the recognized image and the context, at 606 the media processor 150 can request content associated with the identified car but for a high-performance model based on the context of the racec. The requested supplemental content can be an advertisement for the car and/or can be non-marketing material, such as other races in which that particular make and model of the car has won the race. In another embodiment, the recognition of the car by the media processor 150 can be utilized to determine other related content, such as a biography of the car driver. Thus, media processor 150 can utilize recognition of a first object in the content (the car) to determine the identity of a second object (the driver) in the content, such as based on other information associated with the first object without the need to perform recognition on the second object.

At 608, the media processor 150 can receive the supplemental content. The supplemental content can be received from various sources, including different service providers. At 610, the media processor 150 can determine whether the content is sensitive to orientation and/or movement. For example, the media processor 150 can determine whether different views of the supplemental content can be presented, such as based on movement of the source device. If the supplemental content is not capable of being presented with different views or is otherwise not adjustable based on movement of the source device, at 612 the media processor 150 may overlay the supplemental content with the media services and provides augmented content to the display device for presentation.

If on the other hand, the supplemental content is orientation and/or movement sensitive, then at 614 the supplemental content can be presented, such as in an overlay with the other media services, and at 616 the presentation of the supplemental content can be adjusted based on position changes of the source device, such as changes to the orientation and/or other movement.

Figure 7:
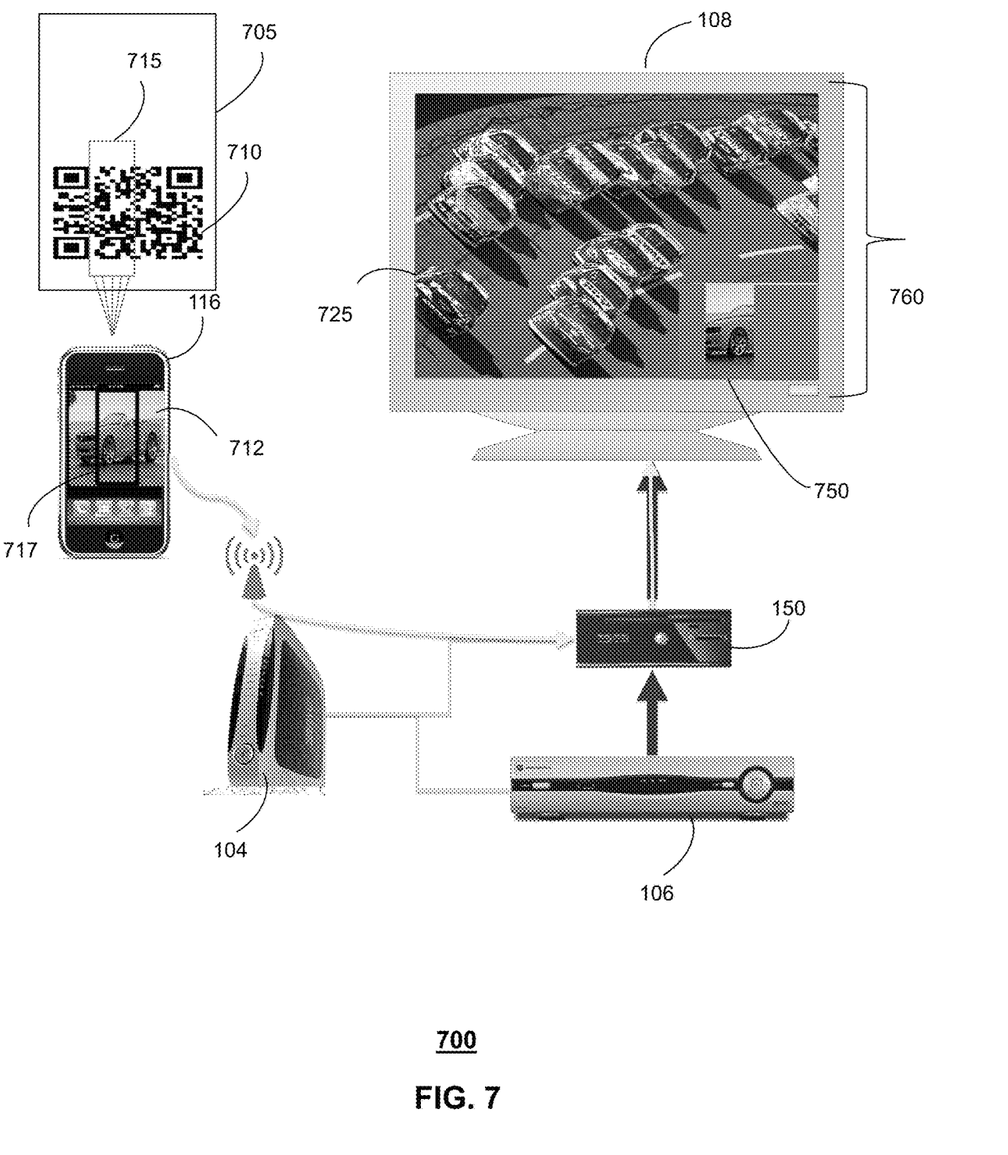
FIGS. 7 and 8 depict illustrative embodiments of portions of the system of FIG. 1 providing media services.

FIG. 7 depicts a portion of a communication system 700, such as system 400 of FIG. 4. The media processor 150 can receive media services from the STB 106, such as scheduled programming 725 of an auto race. In this embodiment, the STB 106 can receive the programming 725 from a service provider network via the gateway 104 and can deliver the services to the media processor 150 via a hardwire link. The media processor 150 can receive supplemental content 712, which in this example is an image of an automobile, from another source (e.g., the mobile device 116) via the gateway 104. In this example, the media processor 150 can have a wireless connection with the gateway 104 so that the supplemental content bypasses the STB 106.

The media processor 150 can overlay the supplemental content 712 with the programming 725 to deliver augmented content 760. In this embodiment, the supplemental content is obtained by the mobile device 116 from a two-dimensional bar code 710 that is included on a medium 705, such as a brochure, advertising leaflet, magazine and so forth. Other mediums can be utilized for supplying the two-dimensional bar code, such as the mobile device 116 reading the bar code from the screen of another display device. In one embodiment, the mobile device 116 can include a bar code reader that can be passed over the bar code 710. For instance, the bar code reader can generate a focus window 715 which is the boundary for data of the bar code that will be presented by the media processor 150. The focus window 715 can be illustrated as a guide window 717 on a display of the mobile device 116, which can include the entire image represented by the bar code if the reader has already captured all of the necessary data to generate such an image at the mobile device display. The image portion 750 within the focus window 715 can be presented at the display device 108. As the focus window 715 is moved with respect to the bar code 710, the image portion 750 can be changed to reflect the movement. In this example, the user can laterally move the mobile device 116 with respect to the bar code 710 to present at the display device 108 different portions of the image of the car.

The use of bar code 710 can also facilitate generation of the augmented content 760. For example, in one embodiment a user can begin scanning the bar code 710 using the reader of the mobile device 116 which initiates the presentation of the augmented content 760 at the display device 108 without the need for the user to enter any other information or any other user actions. The exemplary embodiments describe use of a bar code reader of the mobile device 116, however, it is also contemplated that the bar code can be read by capturing an image of the bar code utilizing a camera of the mobile device and then processing the image to determine the bar code data. In this example, the mobile device 116 can present the guide window 717 in its display which is adjustable by the user, such as through keystrokes, screen gestures and/or movement of the mobile device 116. As described above, the guide window 717 and its movement can be utilized by the media processor 150 to manipulate the presentation of the image portion 750.

One or more of the exemplary embodiments contemplate the bar code 710 including information associated with one or more of the following: processor commands, application launching, URL's, text, images, audio and so forth. Media processor 150 can utilize the information from the bar code to perform various functions, including presentation of text, images and/or audio, as well as launching applications at the media processor or accessing a website having a particular URL.

Figure 8:
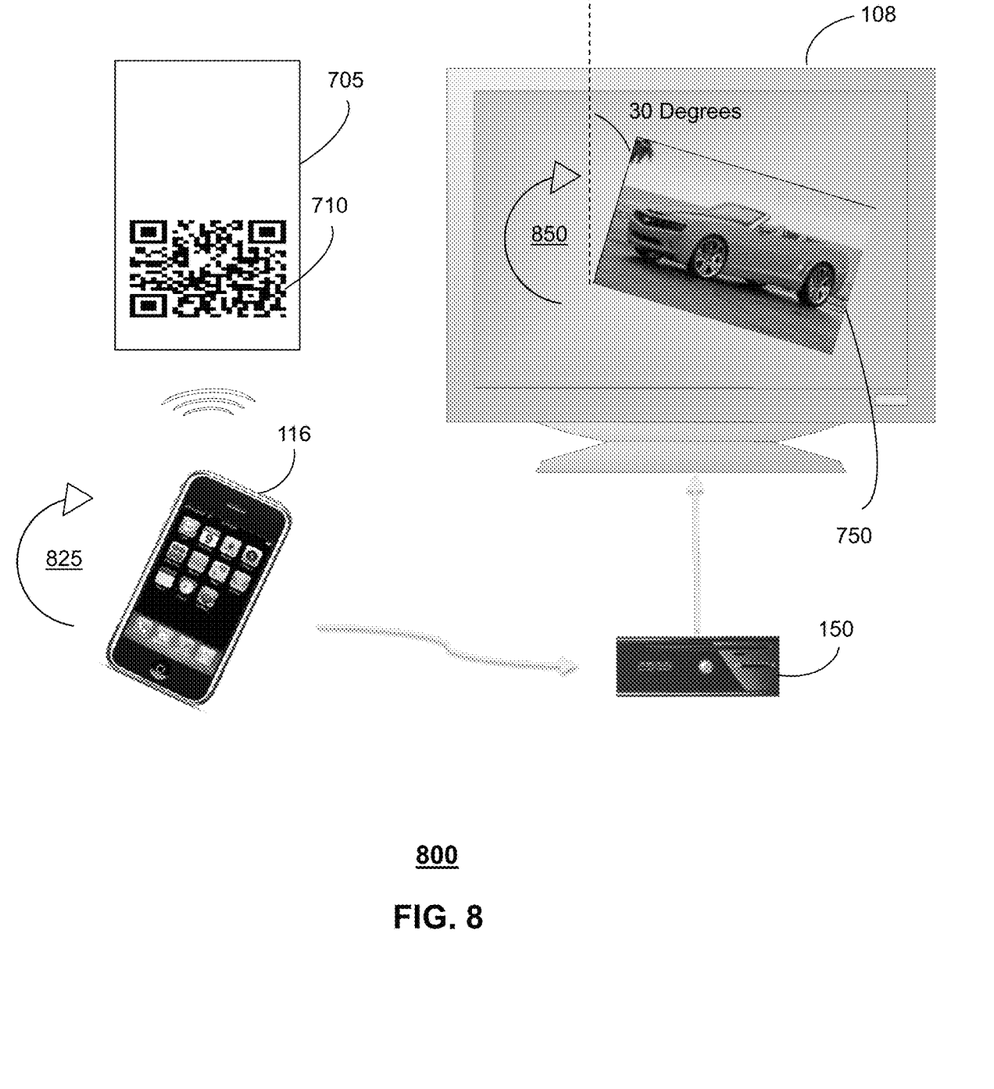

FIG. 8 depicts a portion of a communication system 800, such as system 400 of FIG. 4. The media processor 150 can receive supplemental content 750, which in this example is an image of an automobile, from another source (e.g., the mobile device 116). In this example, the media processor 150 can have a wireless connection with a gateway so that the supplemental content 750 bypasses any STB.

The supplemental content 750 can be obtained by the mobile device 116 in a number of different ways, such as from the two-dimensional bar code 710 that is included on the medium 705. In one embodiment, position data can be transmitted from the mobile device 116 to the media processor 150 along with bar code data, where the position data represents an orientation and/or a movement of the mobile device 116. The position data can be relative to the bar code 710 and/or can be relative to some other focal point. A first position change 825 (e.g., rotating 30 degrees as illustrated in FIG. 8) can be translated by the media processor 150 into a second position change 850 of the supplemental content 750. In this example, the movement of the mobile device 116 is translated directly into the corresponding movement of the supplemental content 750 based on a one-to-one correspondence. However, other techniques can also be utilized, such as utilizing proportional translations of movement (e.g., a 2:1 translation resulting in a 60 degree rotation of the mobile device 116 being translated into a 30 degree rotation of the supplemental content 750).

The position data can also be used for other manipulation of the supplemental content 750. For instance, the movement of the mobile device 116 can provide access to areas of an image that are blocked in other views of the image. As an example, the mobile device 116 can be rotated and moved so as to go from an outside view of the side of the car of supplemental content 750 to an inside view of the inside of the car door. This may be done by rotating and moving the mobile device 116 along the corresponding path. In another embodiment, user commands other than the rotation and movement of the mobile device 116 can be utilized to manipulate the supplemental content 750. For example, depressing a key on the mobile device 116 can cause a car door to open so that the user can then "travel" into the car based on rotation and movement of the mobile device 116. In another example, depressing a different key can cause the depicted engine key to turn and result in audio of the engine starting, along with other information being presented that is associated with the engine performance.

In one embodiment, the rotation and movement of the mobile device 116 can be utilized to manipulate the presentation of supplemental content that is not being obtained from a bar code. For example, the media processor 150 can retrieve images that have three dimensional features. Position signals can be transmitted from the mobile device 116 based on a rotation and/or other movement of the mobile device 116. The position signals can then be utilized to manipulate the presentation of the supplemental content as described above.

Upon reviewing the aforementioned embodiments, it would be evident to an artisan with ordinary skill in the art that said embodiments can be modified, reduced, or enhanced without departing from the scope and spirit of the claims described below. For example, the media processor can be utilized to promote competitor media services. As an example, media content that is being viewed can be analyzed as to cost and quality, and alternative providers can be presented by the media processor 150 which would be accessed via the media processor 150. In this example, the STB may be operated by a first service provider while the media processor may be associated with a second service provider. In another embodiment, multiple media processors 150 can be utilized that are in communication with each other, such as via wireless links directly or via a gateway. Processing resources and/or stored content can be shared amongst the processors to facilitate delivery of augmented content to multiple display devices 108. In another embodiment, the media processors 150 can be multi-mode devices that are capable of communicating using various modes, such as WiFi and Bluetooth and can recognize various mobile devices that are in proximity.

In another embodiment, the retrieval of the supplemental content can be based on identifying a channel being viewed by a user and determining programming that is being presented by the channel at that particular time. The subject matter of the known programming can then be used to determine or otherwise request the supplemental content by the media processor 150.

In one embodiment, supplemental content can come from an application(s) on the media processor 150 and/or from media services on Internet via a mobile device. The mobile device can be the command/control unit, while muxing of the content can be performed via the media processor 150.

Figure 9:
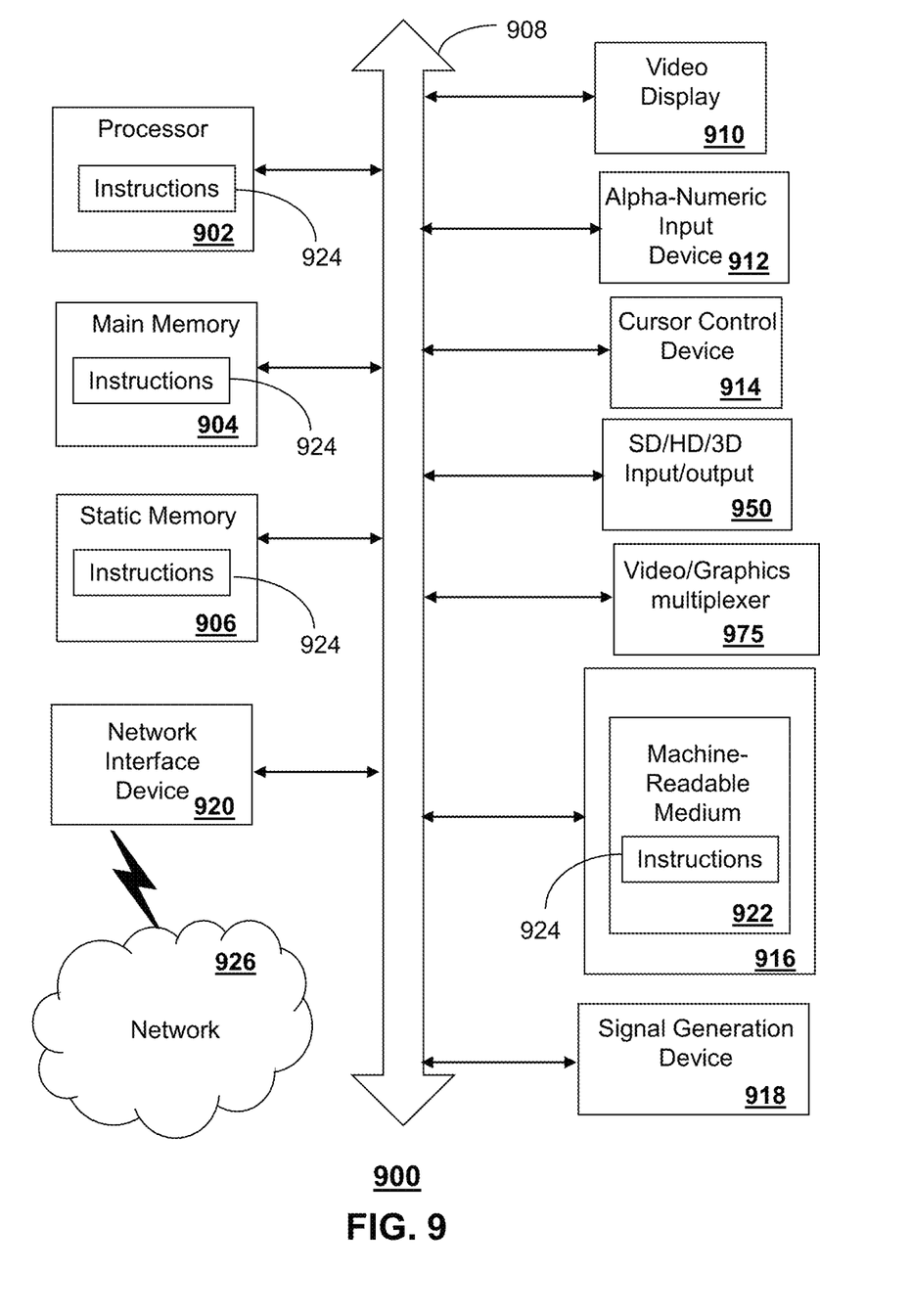
FIG. 9 is a diagrammatic representation of a machine in the form of a computer system within which a set of instructions, when executed, may cause the machine to perform any one or more of the methods discussed herein.

FIG. 9 depicts an exemplary diagrammatic representation of a machine in the form of a computer system 900 within which a set of instructions, when executed, may cause the machine to perform any one or more of the methods discussed above. One or more instances of the machine can operate, for example, as the STB 106, the mobile communication device 116, and the server 130 or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media. An input/output 950 can be utilized for HD, SD and/or 3D content. A video/graphics multiplexer 975 can also be included that acts as a video graphics proxy to mix or otherwise combine multiple data (including multiple data types) from multiple sources. For example, the media processor 150 can include these components which allows for receiving multiple content from multiple sources, mixing of the content, and outputting the mixed content for display at a television or the like.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, the operations comprising:
receiving media content from a first source;
analyzing the media content to identify an object in the media content;
transmitting a request for supplemental content to a second source, wherein the second source is distinct from the first source, and wherein the request is based on the object;
receiving the supplemental content from the second source;
determining that the supplemental content comprises a plurality of views;
identifying a view from the plurality of views for the supplemental content;
generating augmented content containing the supplemental content and the media content; and
providing the augmented content to a display device for presentation,
wherein the view is identified according to movement of the device, orientation of the device, movement of the display device, orientation of the display device, movement of the second source, orientation of the second source, or a combination thereof.

2. The device of claim 1, wherein the analyzing further comprises determining a context for the object.

3. The device of claim 2, wherein the request is based at least in part on the context for the object.

4. The device of claim 1, wherein the object comprises a first object, and wherein the analyzing further comprises determining an identity of a second object in the media content based on recognition of the first object.

5. The device of claim 1, wherein in the generating the augmented content comprises overlaying the supplemental content with the media content.

6. The device of claim 1, wherein the supplemental content is an advertisement.

7. The device of claim 1, wherein the media content is a broadcast of an event and the supplemental content is related to the event.

8. A non-transitory machine-readable storage medium comprising executable instructions that, when executed by a processing system including a processor, facilitate performance of operations, the operations comprising:
obtaining media content from a first source;
identifying an object in the media content;
transmitting a request for supplemental content to a second source, wherein the second source is distinct from the first source, and wherein the request is based on the object;
receiving the supplemental content from the second source;
determining that the supplemental content comprises a plurality of views;
identifying a view from the plurality of views for the supplemental content;
generating augmented content containing the supplemental content and the media content; and
providing the augmented content to a display device for presentation,
wherein the view is identified according to movement of the display device, orientation of the display device, movement of the second source, orientation of the second source, or a combination thereof.

9. The non-transitory machine-readable storage medium of claim 8, wherein the operations further comprise determining a context for the object.

10. The non-transitory machine-readable storage medium of claim 9, wherein the request is based at least in part on the context for the object.

11. The non-transitory machine-readable storage medium of claim 8, wherein in the generating the augmented content comprises overlaying the supplemental content with the media content.

12. The non-transitory machine-readable storage medium of claim 8, wherein the supplemental content is an advertisement.

13. The non-transitory machine-readable storage medium of claim 8, wherein the media content is a broadcast of an event and the supplemental content is related to the event.

14. A method, comprising:
receiving, by a processing system including a processor, media content from a first source;
analyzing, by the processing system, the media content to identify an object in the media content;
transmitting, by the processing system, a request for supplemental content to a second source, wherein the second source is distinct from the first source, and wherein the request is based on the object;
receiving, by the processing system, the supplemental content from the second source;
determining that the supplemental content comprises a plurality of views;
identifying a view from the plurality of views for the supplemental content;
generating, by the processing system, augmented content containing the supplemental content and the media content; and
presenting, by the processing system, the augmented content on a display device of the processing system,
wherein the view is identified according to movement of the display device, orientation of the display device, movement of the second source, orientation of the second source, or a combination thereof.

15. The method of claim 14, wherein the analyzing further comprises determining a context for the object.

16. The method of claim 15, wherein the request is based at least in part on the context for the object.

17. The method of claim 14, wherein in the generating the augmented content comprises overlaying the supplemental content with the media content.

18. The method of claim 14, wherein the supplemental content is an advertisement.

19. The method of claim 14, wherein the media content is a broadcast of an event and the supplemental content is related to the event.

20. The method of claim 14, wherein the media content and the supplemental content comprise video content.

* * * * *